US010452085B2

(12) United States Patent
Gerding et al.

(10) Patent No.: US 10,452,085 B2
(45) Date of Patent: Oct. 22, 2019

(54) FIELD DEVICE WITH A SWITCHING CONVERTER CIRCUIT

(71) Applicant: KROHNE Messtechnik GmbH, Duisburg (DE)

(72) Inventors: Michael Gerding, Bochum (DE); Charalambos Ouzounis, Bochum (DE); Olaf Kaluza, Herten (DE)

(73) Assignee: KROHNE MESSTECHNIK GMBH, Duisburg (DE)

( * ) Notice: Subject to any disclaimer, the term of this patent is extended or adjusted under 35 U.S.C. 154(b) by 359 days.

(21) Appl. No.: 14/731,578

(22) Filed: Jun. 5, 2015

(65) Prior Publication Data
US 2015/0355652 A1    Dec. 10, 2015

(30) Foreign Application Priority Data
Jun. 5, 2014    (DE) .......... 10 2014 107 991

(51) Int. Cl.
G05F 1/56 (2006.01)
G01S 7/02 (2006.01)
G01S 13/02 (2006.01)
G01S 13/08 (2006.01)
G01D 21/00 (2006.01)
G01F 23/284 (2006.01)
H02M 1/44 (2007.01)
H02M 3/155 (2006.01)
(Continued)

(52) U.S. Cl.
CPC ............... G05F 1/56 (2013.01); G01D 21/00 (2013.01); G01F 15/00 (2013.01); G01F 23/00 (2013.01); G01F 23/284 (2013.01); G01S 7/02 (2013.01); G01S 13/02 (2013.01); G01S 13/08 (2013.01); H02M 1/44 (2013.01); H02M 3/155 (2013.01)

(58) Field of Classification Search
CPC ......... G05F 1/56; G01D 21/00; G01F 23/284; G01S 7/02; G01S 13/02; G01S 3/08; H02M 1/44; H02M 3/155
USPC .......................................................... 342/118
See application file for complete search history.

(56) References Cited

U.S. PATENT DOCUMENTS 5,831,396 A * 11/1998 Rudolph ............ H05B 41/2825
315/209 R
6,956,382 B2    10/2005 Nilsson
(Continued)

OTHER PUBLICATIONS

LTC1773 Synchronous Step-Down DC/DC Controller, Linear Technology Corporation; (Jan. 1, 2006) XP055221013, pp. 1-20; found in URL: http://cds.linear.com/docs/en/datasheet/1773fb.pdf.

Primary Examiner — Frank J McGue
(74) Attorney, Agent, or Firm — David S. Safran; Roberts Mlotkowski Safran Cole & Calderon, P.C.

(57) ABSTRACT

A field device (1) having a switching converter circuit (2) and a measuring circuit (3) for determining at least one measuring variable. The switching converter circuit (2) is supplied with electric power on the input side and the switching converter circuit (2) is connected to the measuring circuit (3) on the output side and the switching converter circuit (2) supplies the measuring circuit (3) with electric power.
The problems associated with changing interfering signals due to the switching converter circuit are reduced in that a load circuit (5) is actuated by a load control circuit (6) so that the output-side electric load at the switching converter circuit (2) does not fall below a minimum electric load.

14 Claims, 4 Drawing Sheets

(51) Int. Cl.
*G01F 15/00* (2006.01)
*G01F 23/00* (2006.01)

(56) References Cited

U.S. PATENT DOCUMENTS

| | | |
|---|---|---|
| 7,187,158 B2 | 3/2007 | Huisenga et al. |
| 7,548,072 B2 | 6/2009 | Griessbaum et al. |
| 7,970,063 B2 | 6/2011 | Schulte |
| 8,749,174 B2 | 6/2014 | Angeles |
| 2005/0231182 A1* | 10/2005 | Huisenga ............... H02M 1/146 323/282 |
| 2006/0114698 A1 | 6/2006 | Hatakeyama |
| 2006/0132061 A1 | 6/2006 | McCormick et al. |
| 2007/0176823 A1* | 8/2007 | Griessbaum .......... G01F 23/284 342/175 |
| 2008/0031025 A1* | 2/2008 | Wang .................... H02M 3/156 363/78 |
| 2009/0295355 A1* | 12/2009 | Hirahara ............... H02M 3/157 323/284 |
| 2011/0187205 A1 | 8/2011 | Karbula |
| 2012/0162003 A1* | 6/2012 | Nilsson ................. G01F 23/284 342/124 |
| 2015/0253176 A1* | 9/2015 | Jirskog ................. G01F 23/284 342/58 |

* cited by examiner

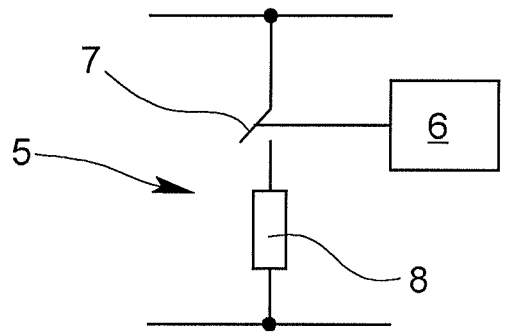
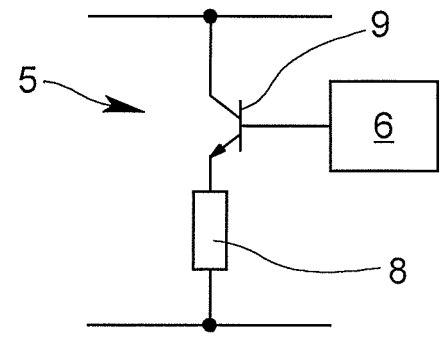
Fig. 2a   Fig. 2b
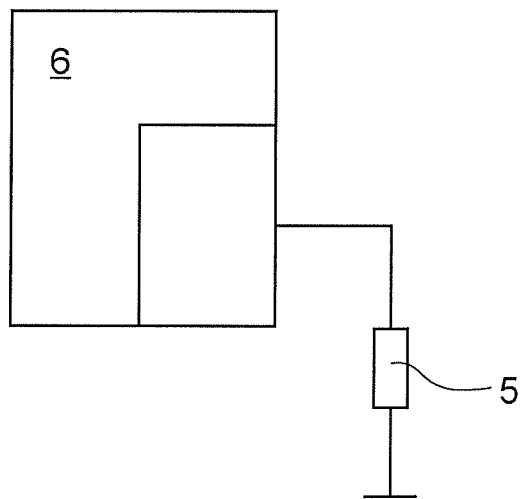
Fig. 2c

FIELD DEVICE WITH A SWITCHING CONVERTER CIRCUIT

BACKGROUND OF THE INVENTION

Field of the Invention

The invention relates to a field device having at least one switching converter circuit and a measuring circuit for determining at least one measuring variable, wherein the switching converter circuit is supplied with electric power on the input side and the switching converter circuit is connected to the measuring circuit on the output side and the switching converter circuit supplies the measuring circuit with electric power.

Description of Related Art

Field devices of the type mentioned above have been known for a long time in process automation and are used for monitoring processes and media handled in the processes due to their ability to determine a measuring variable or also several measuring variables. Such field devices are, for example, configured for determining the flow of a flowable medium through pipes or channels, in that, for example, measuring devices are used that operate using the Coriolis or vortex principles, in which ultrasonic signals are used or which determine the flow using calorimetry. Other field devices of this type can be designed for determining the fill level of a medium, wherein the medium can be, for example, a liquid or also a bulk material. Thereby, it is known from the prior art to evaluate the transit time of electromagnetic signals according to the radar principle or, more specifically, the TDR principle. The Doppler effect is also applicable or plumb lines are used. Further, there is a plurality of field devices for recognizing when a fill level is reached, either capacitively, inductively or using mechanical, swingable elements. Other field devices equipped with a measuring circuit are used for recording a pH value, the temperature, the viscosity or an electrical conductivity of the medium of interest in the process. The details of the measuring variable recorded or determined with the measuring circuit of the field device are not the main point here, rather aspects of the invention described in the following can be used for all field devices having a switching converter circuit and having a measuring circuit.

The switching converter circuit provided in the field device is used essentially for energy supply of the measuring circuit, wherein the switching converter circuit is employed for supplying a defined voltage—usually direct voltage—on the output side, which the measuring circuit needs in order to properly function. Measuring circuits are often used not only for detecting raw measuring variables, but also for processing, filtering, adapting, and converting of signals.

Switching converters, which are also often called switching regulators, are based on the principle of at least one switched mode power supply. Thus, it is possible to boost an input-side direct voltage, for example, using the clocked interruption of the current path with a coil as power supply and subsequent smoothing of the generated voltage peaks. Very different types of switching converters are known, including buck converters, the above-described boost converters, and inverting buck-boost converters, which can supply higher as well as lower (inverted) voltages at the output-side than the voltage that was supplied to the switching converter at the input side.

Switching converter circuits are usually no longer discretely constructed in modern field devices, rather, semiconductor devices provided especially for implementing switching converter circuits are used, which, depending on the specific application, are equipped with an external circuit. The external circuit mostly comprises the always-necessary power supply—usually in the form of a coil—and other circuit parts such as feedback networks and filter circuits. Depending on the input voltages and currents on the output-side load of the switching converter circuit and the corresponding desired output voltages and currents, these circuit parts are often dimensioned according to specifications of the manufacturer of semiconductor parts in order to operate the switching converter circuit overall at the best possible operating point for the specific use.

Due to the switched mode, the switching converter circuit emits interfering signals that, for example, influence the measuring circuit connected at the output side in an undesired manner. The occurrence of different types of interferences and of interference changing over time is particularly problematic since it is difficult to respond to them in terms of circuitry.

SUMMARY OF THE INVENTION

Thus, an object of aspects of the present invention is to provide a field device with a switching converter circuit, in which the problem of changing interference signals is reduced by the switching converter circuit.

According to aspects of the invention, it has been recognized that a particular problem occurs when the switching converter circuit designed for a certain operating point and for a certain obtained power at the output side is operated at a deviating operating point, for example because the power consumption of the measuring circuit connected to the switching converter circuit varies. This can, for example, be the case when the measuring circuit has different operating modes that occur alternatingly. The above described and derived object is met with the field device having a switching converter circuit as described herein in which a load circuit is actuated by a load control circuit so that the output-side electric load at the switching converter circuit does not fall below a minimum electric load.

The basic idea of the measure according to aspects of the invention of providing an additional load circuit includes initially designing the switching converter circuit for specific operation in which the measuring circuit has a comparably high power consumption. For this case, the switching converter circuit is designed so that possible interferences are suppressed using circuitry measures, such as filter circuits. Sinking the power consumption using the measuring circuit shifts the operating point at which the switching converter circuit operates, whereby, in particular, the clocked actuation within the switching converter changes. First, the duty cycle of pulse-width modulation signals (PWM signals) changes. At very low power consumption, it may be that entire duty cycles are skipped in the switching converter circuit, which is often called "burst mode" as opposed to the consistent switched mode, which is also called "PWM mode" in some switching converter circuits.

Since the load circuit is actuated by the load control circuit so that the output side electric load at the switching converter circuit cannot fall below a certain level, i.e., does not fall below a minimum electric load, it is prevented that the operating behavior of the switching converter circuit is subjected to large fluctuations. The operating point of the switching converter circuit varies only to a very limited extent or possibly not at all, when the additional load circuit is actuated by the load control circuit so that the used high load for the circuit design is always applied to the switching converter circuit.

According to a particularly advantageous design, it is provided that the minimum electric load is so large that the switching converter circuit continuously operates in PWM operation mode, such that a burst operating mode of the switching converter circuit is prevented. The specification of which electric load at the outlet of the switching converter circuit switches the central control of the switching converter from the continuously switched PWM operating mode to the above-described burst operating mode can be obtained either in the spec sheet of the manufacturer of the switching converter circuit or of the switching converter semiconductor component provided in the switching converter circuit at a central location, or possibly the power limit at which a change between the two operating modes occurs can be measured.

While the switching converter circuit causes relatively continuous interference as long as it remains in the continuously switched PWM operating mode, i.e., only changes the duty cycle of the operating PWM signal, interference during transition into the burst operating mode and during continual operation in the burst operating mode varies. In particular, the frequency parts of the interference are shifted and possibly interference may become more broadband overall, which is to be avoided.

A field device is preferred with its load circuit designed so that the minimum electric load corresponds approximately to the maximum load of the measuring circuit, in particular, corresponds to the maximum load of the measuring circuit during standard measuring operation. Standard measuring operation means the regular measuring operation of the field device with an active measuring circuit, as opposed to, for example, the starting of the field device during initial operation or, for example, during a reset or during a restart of the field device due to errors.

It is provided in one design that the load circuit is connected in parallel to the measuring circuit. In another design, it is provided that the load circuit is implemented as a part of the measuring circuit. In both cases, the load circuit is designed so that it boosts the electric load provided on the output side by the switching converter circuit to at least the minimum electric load, as long as the sole operation of the measuring circuit no longer suffices to consume this minimum load on the output side of the switching converter circuit.

In a particularly simple design of an embodiment of the field device, it is provided that the load circuit has a switch, which is switchable by the load control circuit. A current path is closed via the switch, in which so much power is consumed that the required minimum load at the switching converter circuit is at least just met. It is possible to have several such current paths for adding in different additional loads.

According to another variation of the field device according to aspects of the invention, it is provided that the load circuit comprises at least one transistor, which is actuated by the load control circuit. Thus, a variable additional load can be implemented at the switching converter circuit, so that the operating point of the switching converter circuit can be kept very exactly constant, e.g., constant at the minimum load or also constant above the minimum load.

In an advantageous further development, it is provided that the load circuit and the load control circuit are implemented using at least one microcontroller, wherein electric power is used by actuating at least one I/O port of the microcontroller. The I/O port of the microcontroller can, for example, drive a current to ground via an electrical resistor and, thus, can provide for additional power consumption. The advantage of this variation is that, for example, a microcontroller can be used for this that is already provided in the measuring circuit of the field device.

One advantageous design of the field device is characterized in that the load control circuit actuates the load circuit depending on an operating mode of the measuring circuit. Thus, an exact measurement of the power consumption of the measuring circuit is not made here, instead only the operating mode being used by the measuring circuit is determined, since this is often a sufficient indication of the power consumption of the measuring circuit.

For example, the field device can be a radar measuring device for measuring distance. Said device has at least one first operating mode for emitting and receiving HF (high frequency) radiation as well as for digitizing and storing the emitted and received HF radiation. Additionally, said field device has a second operating mode, in which the stored, digitized, emitted and received HF radiation is evaluated. In such field devices designed as radar measuring devices, there is often a greater load in terms of electrical power in the second operating mode compared to the first operating mode. In such a field device, it is then provided according to the invention that the load control circuit actuates the load circuit in the first operating mode and thus switches it on, so that a load for the switching converter circuit also occurs in the first operating mode as it does in the second operating mode without additionally switching the load circuit on.

It is provided in a further development of the field device that the output side electric load on the switching converter circuit is determined by recording at least one electrical parameter from the load control circuit and the load circuit is actuated by the load control circuit depending on the determined electric load. It is preferably provided that the at least one electrical parameter is the overall driven current on the output side from the switching converter circuit, since when the voltage of the switching converter circuit is permanently set, power output and power usage can be collectively determined. Using such a direct measured determination of the used power allows for a practical, arbitrarily refined implementation of power regulation using the load circuit and the load control circuit.

In detail, there is a plurality of possibilities for designing and further developing the field device according to aspects of the invention as will be apparent from the following description of embodiments in conjunction with the accompanying drawings.

BRIEF DESCRIPTION OF THE DRAWINGS

FIGS. 2a, 2b, 2c are different possibilities for implementing the load circuit.

DETAILED DESCRIPTION OF THE INVENTION

Figure 1:
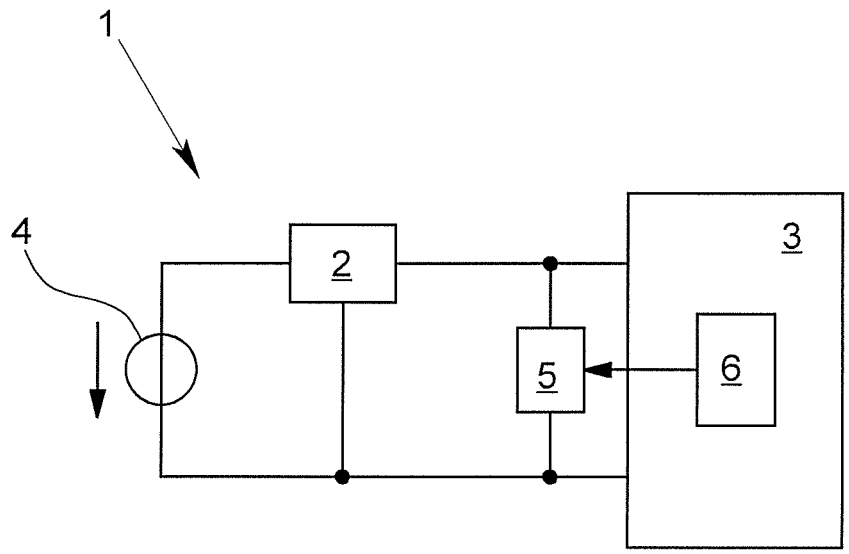
FIG. 1 is a field device with a switching converter circuit, wherein the load circuit is implemented outside of the measuring circuit and the load control circuit is implemented within the measuring circuit.

In FIGS. 1 and 3 to 6, a field device 1 is shown with a switching converter circuit 2 and with a measuring circuit 3 for determining a measuring variable.

The field device 1 is supplied with electric power via a voltage source 4, wherein the voltage source 4 supplies the switching converter circuit 2 on the input side with electric power.

In FIGS. 1 and 4 to 6, the voltage source 4 belongs to the field device 1. The field device according to FIG. 3, however, is a two-wire field device, which is thus supplied with power by an external voltage source 4 and issues the encoded, determined measured value via the current of the two-wire current loop (4 mA-20 mA interface). The voltage source 4 in this design does not belong to the field device 1. It is not of particular importance whether the voltage source 4 is directly connected to the switching converter circuit 2 on the input side or possibly via additionally provided electric networks, however, since it is the case in all circumstances that the voltage source 4 directly or indirectly supplies the switching converter circuit 2 with power on the input side.

It can be seen in the figures that the switching converter circuit 2 is connected to the measuring circuit 3 on the output side and the switching converter circuit 2 supplies the measuring circuit 3 with electric power. Here, as well, it is not of particular importance whether the switching converter circuit 2 is directly connected to the measuring circuit 3 or indirectly via further electric networks, however, since the functional connection of power supply to the measuring circuit 3 occurs through the switching converter circuit 2.

The switching converter circuit 2 may be designed for a certain operating point and thus for a certain output side power usage. This means that the interfering signals generated by a switching converter circuit 2 or by certain switching parts of the switching converter circuit 2 and acting in the direction of the measuring circuit 3 are as optimally suppressed as possible for this operating point. If there is a deviation from the operating point, other interfering signals are generated, possibly more broadband or also shifted in terms of frequency, so that the suppression of interfering signals, which was designed for another operating point, is no longer completely effective.

It is provided in the shown field devices 1 that a load circuit 5 is actuated by a load control circuit 6 so that the output side electric load on the switching converter circuit 2 does not fall below a minimum electric load. Embodiments described herein prevent the switching converter circuit 2 from being loaded on the output side with very different electric loads and thus emitting very differently designed interfering signals. The switching converter circuit 2 is thus always configured and optimized in the shown embodiments so that a suppression of interfering signals is provided for a high load on the output side. This takes into account that the power used on the output side by the switching converter circuit 2 can be increased in terms of circuitry, but cannot be decreased by the measuring circuit 3 to a power required for proper functioning using an additional circuitry measure.

Figure 3:
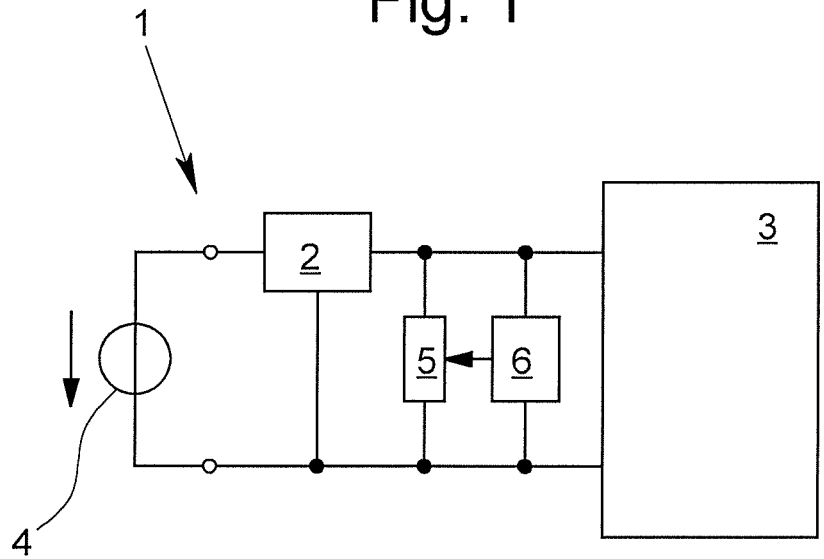
FIG. 3 is a field device designed as two-wire device in which the load circuit and the load control circuit are implemented outside of the measuring circuit.

In the embodiment according to FIG. 1, the load circuit 5 is provided outside of the measuring circuit 3, whereas the load control circuit 6 is implemented inside of the measuring circuit 3. In contrast, the embodiment according to FIG. 3 shows a load circuit 5 as well as a load control circuit 6, which are both implemented outside of the measuring circuit FIGS. 2a-2c show different variations of the implementation of a load circuit 5 and a load control circuit 6. In FIG. 2a, it is shown that the load circuit 5 includes an activatable switch 7 and an ohmic resistor 8. The load control circuit 6 switches the switch 7 and thus activates an additional current path, via which power is used by the switching converter circuit 2. In the embodiment in FIG. 2b, the load circuit 5 is implemented by a transistor 9 and a downstream ohmic resistor 8. The basis of the transistor 9 is actuated by the load control circuit 6. The transistor 9 can be operated as a switch. It is possible to implement continual load adaptation with the provided load circuit 5 and load control circuit 6, so that a minimum electric load can be set, and a constant load and thus a constant operating point of the switching converter circuit 2 can be guaranteed.

In the embodiment according to FIG. 2c, the load circuit 5 and the load control circuit 6 are implemented by a microcontroller, whose I/O ports are actuated and which drives a current to ground via the load circuit 5 in the form of an ohmic resistor and thus provides an increased power requirement.

Figure 4:
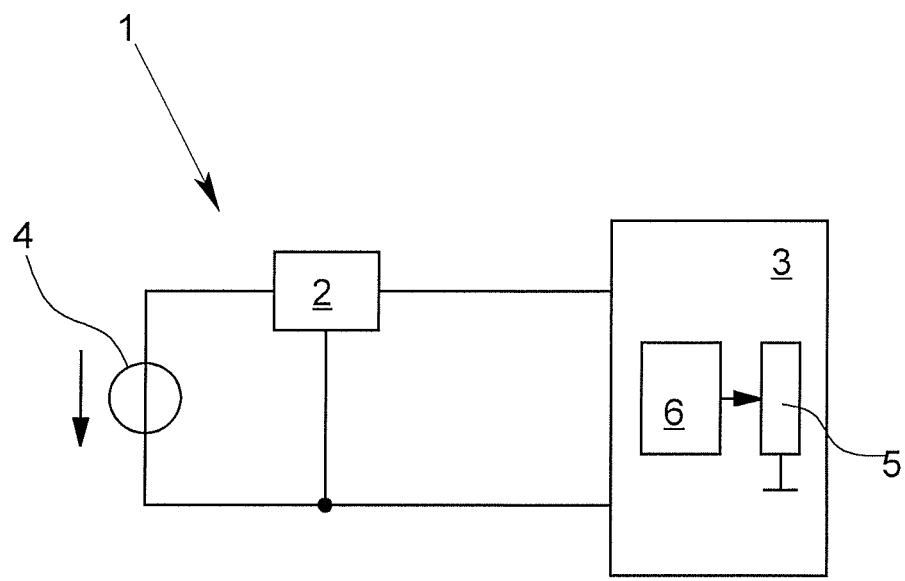
FIG. 4 is a field device, in which the load circuit and the load control circuit are implemented completely within the measuring circuit.

The field device 1 according to FIG. 4 shows a solution in which the load circuit 5 and also the load control circuit 6 are both implemented within the measuring circuit 3, so that no additional modules are required. This implementation reduces assembly efforts.

Figure 5:
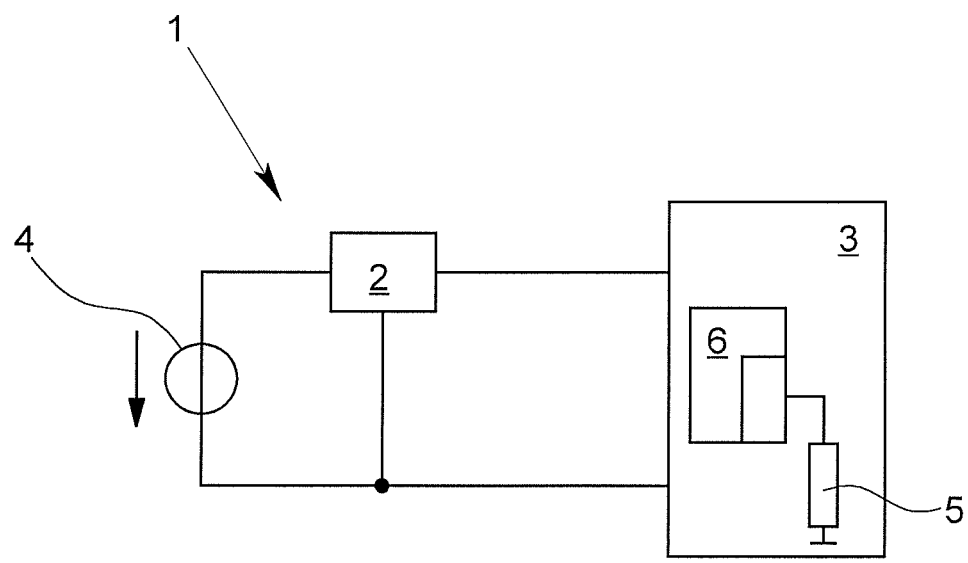
FIG. 5 is the field device according to FIG. 4, in which the load control circuit is implemented in a microcontroller of the measuring circuit.

FIG. 5 shows a precise embodiment of the solution according to FIG. 4. In this embodiment, the load control circuit 6 is provided within the microcontroller already provided in the measuring circuit 3. The electric power is used by actuating an I/O port of the microcontroller, wherein, in the present case, the I/O port of the microcontroller is loaded by the load circuit 5 in the form of an ohmic resistor. Of course, it is possible to connect several I/O ports of the microcontroller simultaneously to implement different electric loads. The outlet can, for example, be implemented not only by a digital I/O port, but also by an analog outlet, i.e., the outlet of an integrated D/A converter. Thus, by varying the outlet voltage at the I/O port of the microcontroller, the amount of additionally used power can be set very exactly and varied very easily.

If a very exact setting of the electric load implemented by the load circuit 5 is not of importance (e.g., when it is only to be avoided that the switching converter circuit 2 changes from the standard PWM operating mode into the burst operating mode), then the load circuit 5 and the load control circuit 6 can be connected only in dependence on an operating mode. This type of use is shown in FIG. 7.

Figure 7:
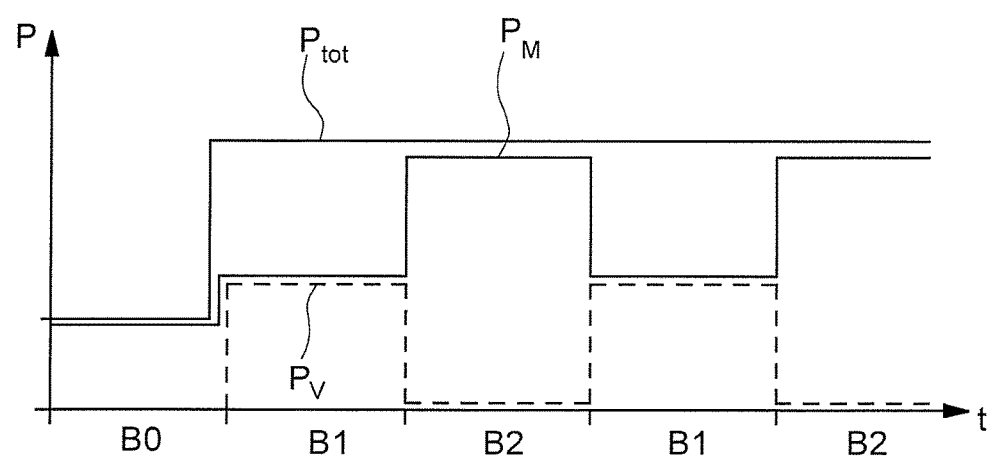
FIG. 7 is a diagram representing the regulation of power using the load circuit and the load control circuit in different operating modes of a field device.

As shown in FIG. 7, the field device 1 has different operating modes, which are called B0, B1 and B2. B0 is the operating mode for starting the field device, B1 is a first operating mode and B2 is a second operating mode. The curve identified by $P_M$ shows the power consumption of the measuring circuit 3. It is evident that a particularly high power consumption is present in the second operating mode B2, whereas a significantly lower power consumption is present due to the measuring circuit 3 in the first operating mode B1.

In embodiments, the load control circuit 6 actuates the load circuit 5 in the first operating mode B1, whereby the additional power $P_V$ is consumed. In the second operating mode B2, however, the load circuit 5 is not actuated by the load control circuit 6, so that the additional power requirement $P_V$ of the load circuit 5 sinks to zero. Due to the described connection and the described use of the load circuit 5 and the load control circuit 6, it is achieved that the power consumption of the measuring circuit 3 and the load circuit 5 correspond practically consistently to the total load $P_{tot}$, so that the output side electric load at the switching converter circuit 2 does not fall below a minimum electric load.

The example shown in FIG. 7 shows the operation of a field device 1 designed as a radar measuring device used for measuring distance. The first operating mode B1 is used for emitting and receiving HF radiation as well as for digitizing and storing the emitted and received HF radiation. The second operating mode B2 is used for evaluating the stored, digitized, emitted and received HF radiation, wherein the required electric power for carrying out the second operating mode B2 is greater than the required power for carrying out the first operating mode B1.

Figure 6:
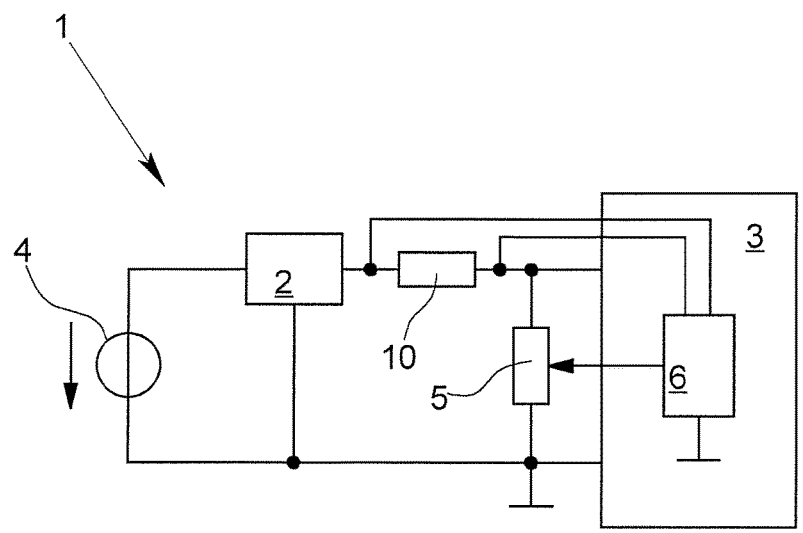
FIG. 6 is a field device, in which the power used by the switching converter circuit is determined by measurement and used for power regulation.

An embodiment of a field device 1 is shown in FIG. 6, in which the load circuit 5 and the load control circuit 6 are operated in a controlled mode. The current used from the switching converter circuit 2 is measured via a current-measuring resistor 10, similar to the voltage at the outlet of the switching converter circuit 2. By determining these two electrical parameters using the load control circuit 5, the actual used electric power and thus the electric load on the switching converter circuit 2 is determined. Depending on the determined electric load, the load circuit 5 is then actuated by the load control circuit 6, so that a uniform electric load on the switching converter circuit 2 can be practically continuously provided.

What is claimed is:

1. A field device comprising:
 a switching converter circuit and a measuring circuit for determining at least one measuring variable,
 wherein the switching converter circuit is supplied with electric power on an input side and the switching converter circuit is connected to the measuring circuit on an output side and the switching converter circuit supplies the measuring circuit with electric power, and
 wherein a load circuit including a resistive element is arranged at the output side of the switching converter circuit and is actuated by a load control circuit so that an output-side electric load at the switching converter circuit does not fall below a minimum electric load as a result of resistance applied by the resistive element.

2. The field device according to claim 1, wherein the minimum electric load is so large that the switching converter circuit continuously operates in PWM operation mode.

3. The field device according to claim 2, wherein the minimum electric load is so large that a burst-operating mode of the switching converter circuit is prevented.

4. The field device according to claim 1, wherein the minimum electric load corresponds to a maximum load of the measuring circuit.

5. The field device according to claim 4, wherein the minimum electric load corresponds to the maximum load of the measuring circuit in standard measuring operation.

6. The field device according to claim 1, wherein the load circuit is connected in parallel to the measuring circuit or the load circuit is implemented as part of the measuring circuit.

7. The field device according to claim 1, wherein the load circuit comprises at least one transistor that is actuated by the load control circuit.

8. The field device according to claim 1, wherein the load circuit and the load control circuit are implemented by at least one microcontroller, wherein electric power is used by actuating at least one I/O port of the microcontroller.

9. The field device according to claim 8, wherein electric power is used by driving a current over an electrical resistor to ground.

10. The field device according to claim 1, wherein the load control circuit actuates the load circuit in dependence on the operating mode of the measuring circuit by controlling, via the load control circuit, whether the resistive element is connected or disconnected from the output of the switching converter circuit.

11. The field device according to claim 10, wherein the field device is a radar measuring device for measuring distance and has at least one first operating mode for emitting and receiving HF radiation as well as for digitizing and storing the emitted and received HF radiation, and at least a second operating mode for evaluating the stored, digitized, emitted and received HF radiation, wherein the load control circuit actuates the load circuit in the first operating mode.

12. The field device according to claim 1, wherein the output-side electric load at the switching converter circuit is determined by detecting at least one electric parameter from the load control circuit and the load circuit is actuated by the load control circuit in dependence on the determined electric load, wherein the at least one electric parameter is the total driven current from the output side of the switching converter circuit.

13. The field device according to claim 1, wherein the at least one electric parameter is the total driven current from the output side of the switching converter circuit.

14. The field device according to claim 1, wherein the load circuit is configured to implement continual load adaptation in response to the load control circuit.

* * * * *